(12) United States Patent
Foote et al.

(10) Patent No.: US 8,915,601 B2
(45) Date of Patent: Dec. 23, 2014

(54) EXTERIOR MIRROR ASSEMBLY WITH ACTUATOR

(75) Inventors: Keith D. Foote, Grand Rapids, MI (US); Joseph C. Snow, Lowell, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 417 days.

(21) Appl. No.: 13/023,747

(22) Filed: Feb. 9, 2011

(65) Prior Publication Data

US 2011/0194203 A1 Aug. 11, 2011

Related U.S. Application Data

(60) Provisional application No. 61/303,042, filed on Feb. 10, 2010.

(51) Int. Cl.
*G02B 7/182* (2006.01)
*B60R 1/072* (2006.01)

(52) U.S. Cl.
CPC ............. *B06R 1/062* (2013.01); *B60R 1/072* (2013.01)
USPC ....................................... 359/876

(58) Field of Classification Search
USPC ............................ 359/874, 876
See application file for complete search history.

(56) References Cited

U.S. PATENT DOCUMENTS

| | | |
|---|---|---|
| 3,119,591 A | 1/1964 | Malecki |
| 4,477,149 A * | 10/1984 | Crespy ........................ 359/876 |
| 4,699,024 A | 10/1987 | Iida et al. |
| 4,832,477 A | 5/1989 | Torii et al. |
| 5,005,797 A | 4/1991 | Maekawa et al. |
| 5,190,499 A | 3/1993 | Mori et al. |
| 5,210,651 A | 5/1993 | Shibuya et al. |
| 5,371,659 A | 12/1994 | Pastrick et al. |
| 5,424,898 A | 6/1995 | Larson et al. |
| 5,489,080 A | 2/1996 | Allen |
| 5,497,306 A | 3/1996 | Pastrick |
| 5,513,048 A | 4/1996 | Chen |
| 5,546,239 A | 8/1996 | Lewis |
| 5,572,376 A | 11/1996 | Pace |
| 5,579,178 A | 11/1996 | Mochizuki |
| 5,624,176 A | 4/1997 | O'Farrell et al. |
| 5,659,423 A | 8/1997 | Schierbeek et al. |
| 5,669,699 A | 9/1997 | Pastrick et al. |
| 5,703,731 A | 12/1997 | Boddy et al. |
| 5,786,772 A | 7/1998 | Schofield et al. |
| 5,796,176 A | 8/1998 | Kramer et al. |
| 5,823,654 A | 10/1998 | Pastrick et al. |
| 5,900,999 A | 5/1999 | Huizenga et al. |
| 5,903,402 A | 5/1999 | Hoek |

(Continued)

*Primary Examiner* — Jennifer L. Doak
(74) *Attorney, Agent, or Firm* — Gardner, Linn, Burkhart & Flory, LLP

(57) ABSTRACT

An exterior rearview mirror assembly for a vehicle includes a mounting portion mounted to a side of a vehicle, a mirror head portion, a reflective element fixedly attached at the mirror head portion, and an actuator operable to impart pivotal movement of the mirror head portion relative to the mounting portion and about a generally horizontal pivot axis and a generally vertical pivot axis to adjust the mirror head portion and the reflective element relative to the side of the vehicle to which the mounting portion is mounted. The actuator may include a tilting drive system for tilting the mirror head portion about the generally horizontal pivot axis and the actuator may include a rotating drive system for rotating the mirror head portion about the generally vertical pivot axis.

20 Claims, 9 Drawing Sheets

(56) References Cited

U.S. PATENT DOCUMENTS

| | | |
|---|---|---|
| 5,929,786 A | 7/1999 | Schofield et al. |
| 5,949,591 A | 9/1999 | Whitehead |
| 5,969,890 A | 10/1999 | Whitehead |
| 5,986,364 A | 11/1999 | Bingle et al. |
| 6,176,602 B1 | 1/2001 | Pastrick et al. |
| 6,198,409 B1 | 3/2001 | Schofield et al. |
| 6,213,612 B1 | 4/2001 | Schnell et al. |
| 6,227,689 B1 | 5/2001 | Miller |
| 6,229,226 B1 | 5/2001 | Kramer et al. |
| 6,239,928 B1 | 5/2001 | Whitehead et al. |
| 6,243,218 B1 | 6/2001 | Whitehead |
| 6,276,821 B1 | 8/2001 | Pastrick et al. |
| 6,312,135 B1 | 11/2001 | Polzer |
| 6,325,518 B1 | 12/2001 | Whitehead et al. |
| 6,362,548 B1 | 3/2002 | Bingle et al. |
| 6,467,920 B2 | 10/2002 | Schnell et al. |
| 6,522,451 B1 | 2/2003 | Lynam |
| 6,582,109 B2 | 6/2003 | Miller |
| 6,685,864 B2 | 2/2004 | Bingle et al. |
| 6,698,905 B1 | 3/2004 | Whitehead |
| 6,717,712 B2 | 4/2004 | Lynam et al. |
| 6,755,544 B2 | 6/2004 | Schnell et al. |
| 6,882,287 B2 | 4/2005 | Schofield |
| 6,916,100 B2 | 7/2005 | Pavao |
| 7,038,577 B2 | 5/2006 | Pawlicki et al. |
| 7,073,914 B2 | 7/2006 | Pavao |
| 7,080,914 B1 | 7/2006 | Boddy |
| 7,093,946 B2 | 8/2006 | Barve et al. |
| 7,104,663 B2 | 9/2006 | Whitehead |
| 7,126,456 B2 | 10/2006 | Boddy et al. |
| 7,159,992 B2 | 1/2007 | Foote |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,267,449 B1 | 9/2007 | Boddy et al. |
| 7,314,285 B2 | 1/2008 | Ruse et al. |
| 7,492,281 B2 | 2/2009 | Lynam et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,722,199 B2 | 5/2010 | DeWard et al. |
| 7,748,856 B2 | 7/2010 | Zhao |
| 7,944,371 B2 | 5/2011 | Foote et al. |
| 2002/0063978 A1* | 5/2002 | Guttenberger et al. ....... 359/877 |
| 2006/0061008 A1 | 3/2006 | Karner et al. |
| 2007/0002477 A1 | 1/2007 | Whitehead |
| 2009/0040306 A1 | 2/2009 | Foote et al. |
| 2010/0182143 A1 | 7/2010 | Lynam |
| 2011/0194203 A1* | 8/2011 | Foote et al. ................... 359/876 |

\* cited by examiner

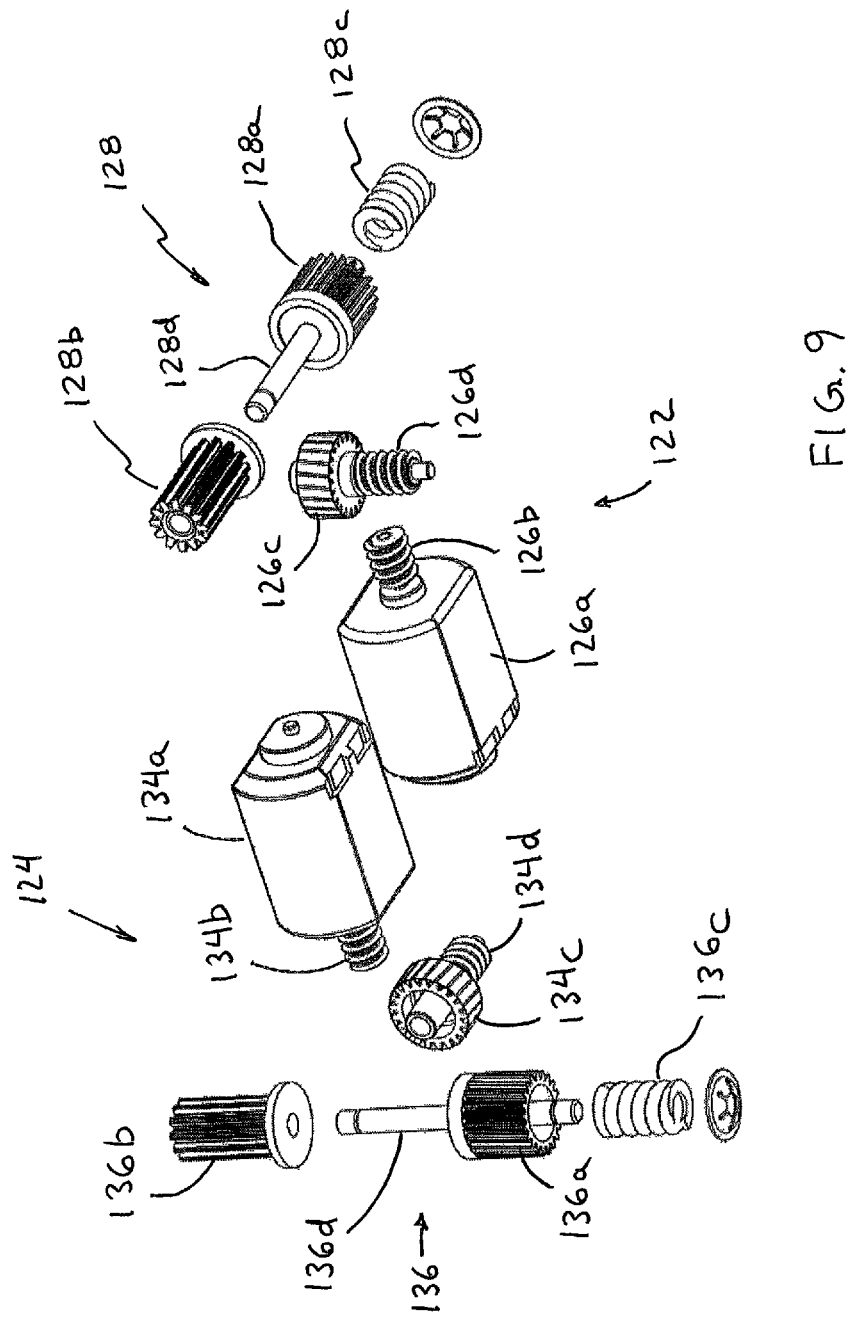

EXTERIOR MIRROR ASSEMBLY WITH ACTUATOR

CROSS REFERENCE TO RELATED APPLICATION

The present application claims the filing benefit of U.S. provisional application Ser. No. 61/303,042, filed Feb. 10, 2010, which is hereby incorporated herein by reference in its entirety.

FIELD OF THE INVENTION

The present invention relates to exterior rearview mirror assemblies and, more particularly, to an exterior rearview mirror assembly that is adjustable relative to the side of the vehicle to which it is mounted.

BACKGROUND OF THE INVENTION

It is known to provide a vehicular exterior rearview mirror assembly that has a mirror casing and reflective element that are adjustable relative to the side of the vehicle to which the mirror assembly is mounted. The mirror reflective element typically is adjusted via an actuator disposed behind the reflective element and within the mirror casing. Examples of adjustable rearview mirror assemblies and actuators are described in U.S. Pat. Nos. 7,314,285; 7,267,449; 7,159,992; 7,093,946; 6,312,135; 6,243,218; and/or 5,703,731, which are hereby incorporated herein by reference in their entireties.

SUMMARY OF THE INVENTION

The present invention provides an exterior rearview mirror assembly that has a reflective element and mirror casing or head portion that are adjustable via an actuator that moves or pivots the head portion and reflective element upwardly, downwardly and/or sidewardly relative to a mounting arm or base portion of the mirror assembly, in order to adjust the rearward field of view of the driver of the vehicle equipped with the mirror assembly.

According to an aspect of the present invention, an exterior rearview mirror assembly for a vehicle includes a mounting portion mounted to a side of a vehicle, a mirror casing or head portion, a reflective element supported at or fixedly attached at or to the mirror head portion, and an actuator. The actuator is operable to impart pivotal movement of the head portion relative to the mounting portion to adjust the head portion and reflective element relative to the side of the vehicle to which the mounting portion is mounted. The head portion and reflective element supported thereat thus may be moved or adjusted to provide the desired rearward field of view to the driver of the vehicle.

These and other objects, advantages, purposes and features of the present invention will become apparent upon review of the following specification in conjunction with the drawings.

BRIEF DESCRIPTION OF THE DRAWINGS

FIG. 9 is an exploded perspective view of the motors and gears of the actuator of the exterior rearview mirror assembly of FIG. 6.

DESCRIPTION OF THE PREFERRED EMBODIMENTS

Figure 1:
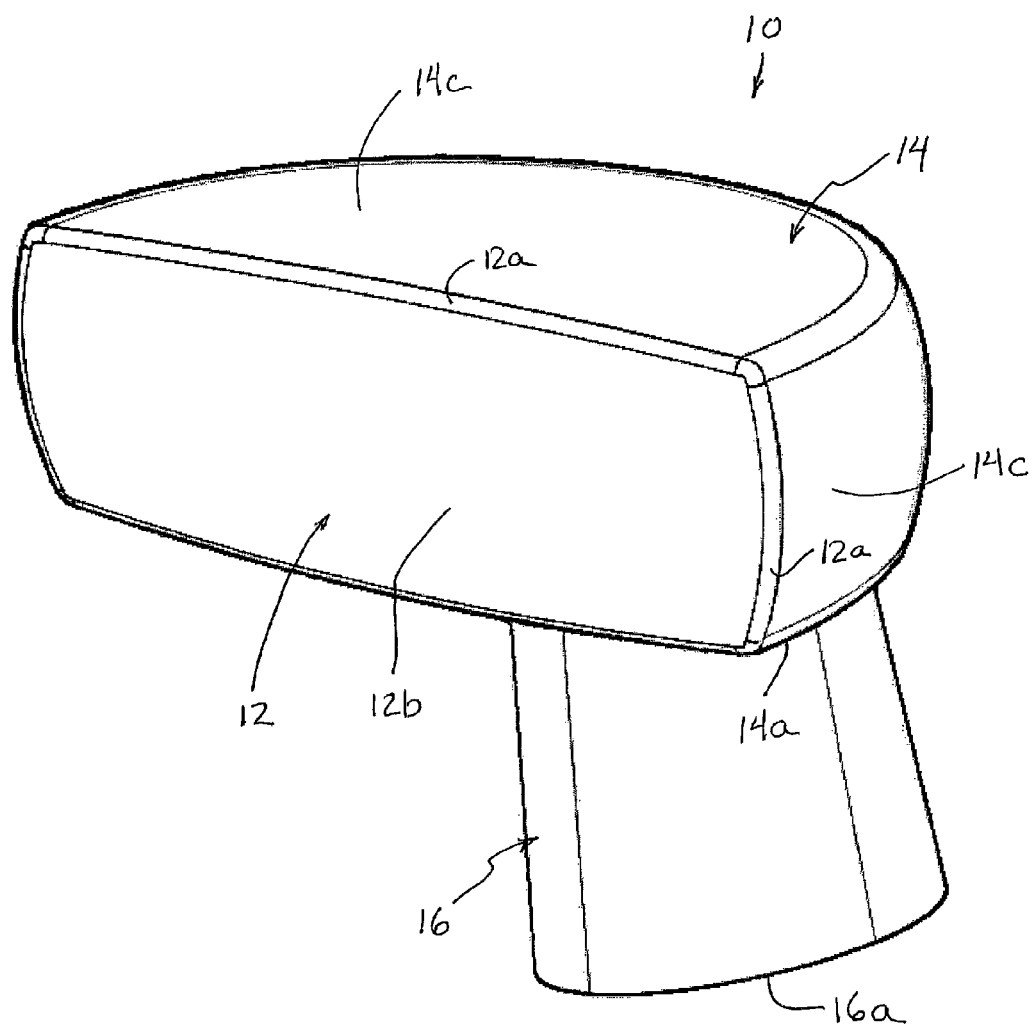
FIG. 1 is a perspective view of an exterior rearview mirror assembly in accordance with the present invention.
Figure 2:
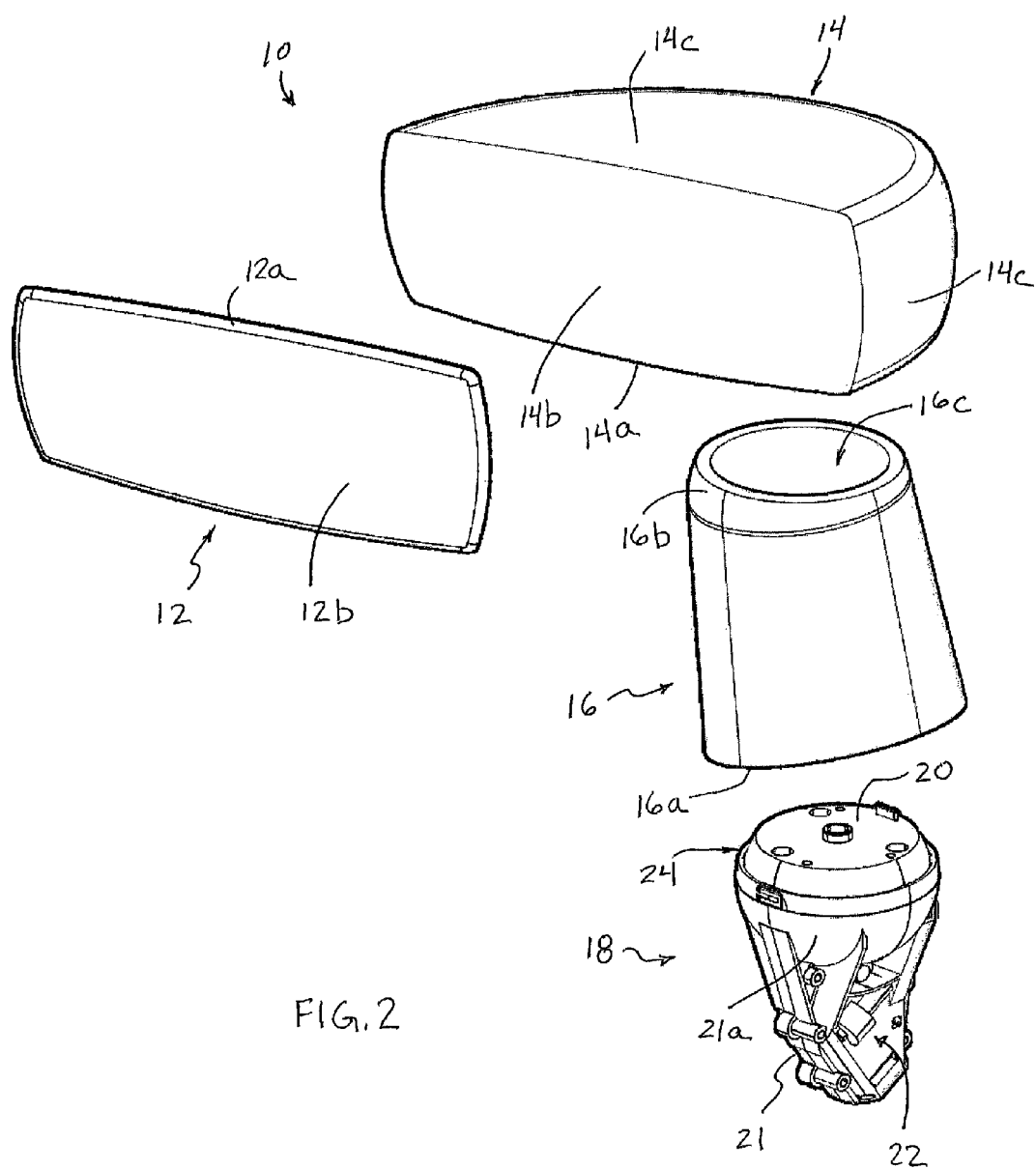
FIG. 2 is an exploded perspective view of the rearview mirror assembly of FIG. 1.
Figure 3:
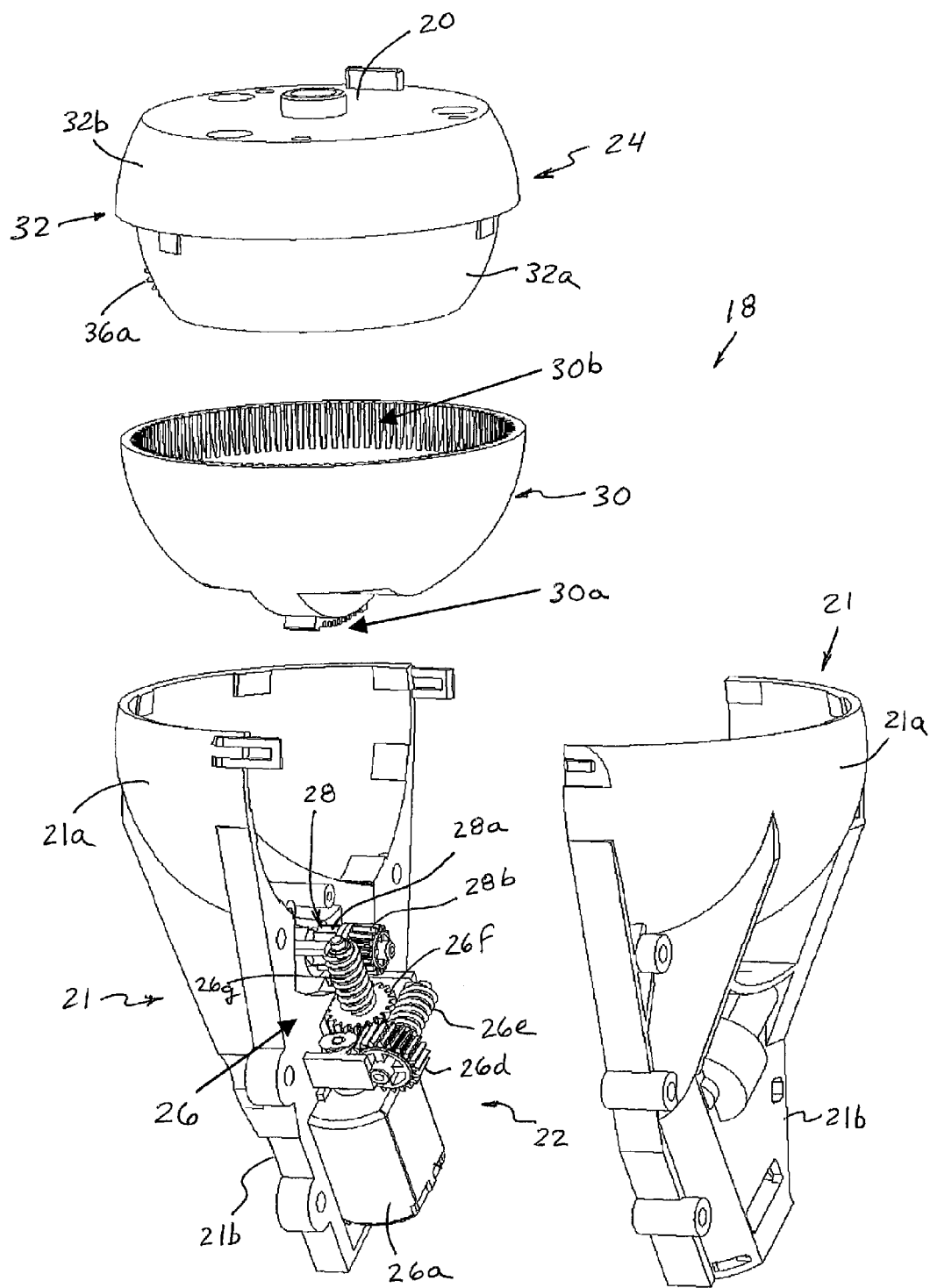
FIG. 3 is an exploded perspective view of an actuator of the exterior rearview mirror assembly in accordance with the present invention.
Figure 4:
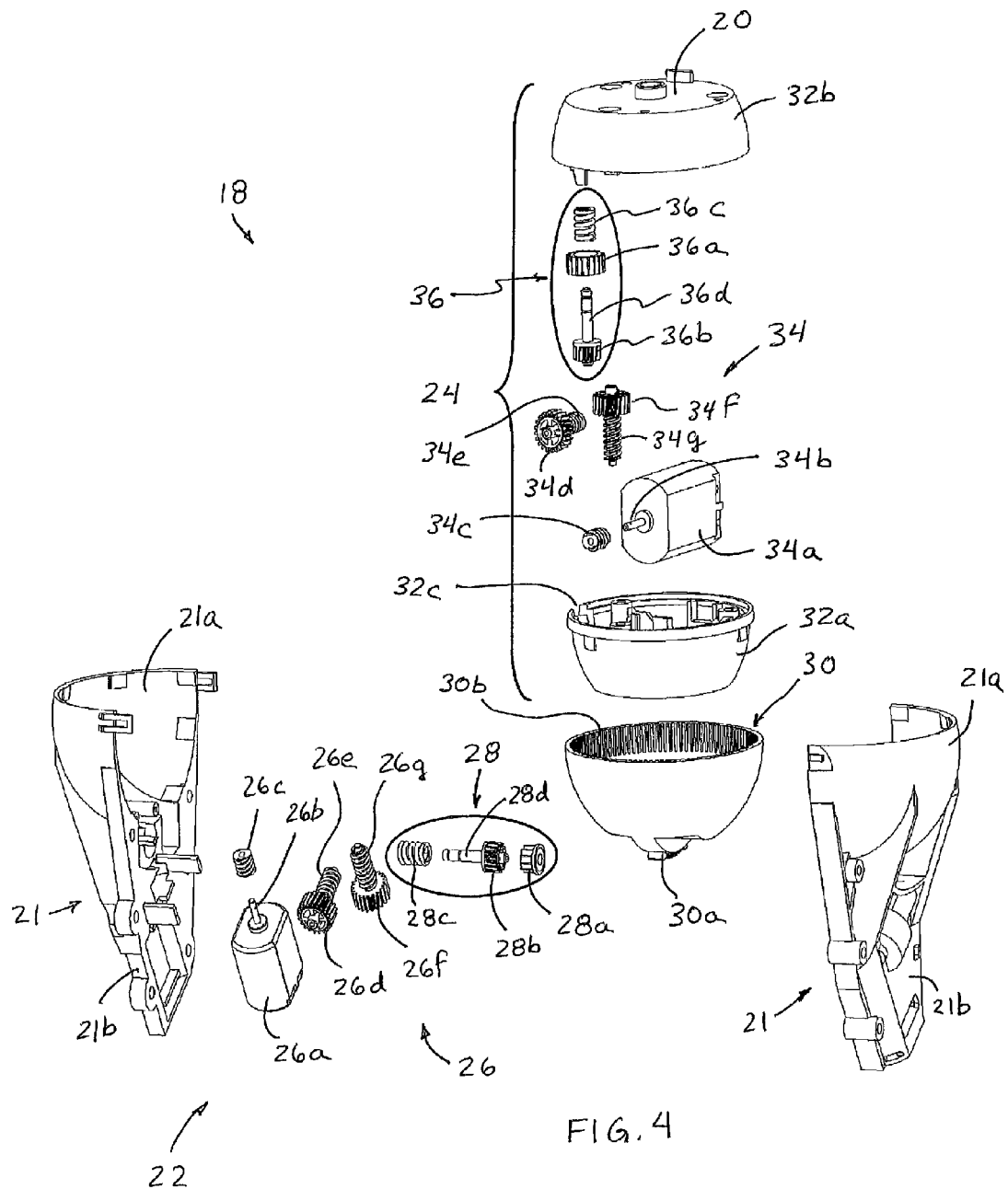
FIG. 4 is another exploded perspective view of the actuator of the present invention.
Figure 5:
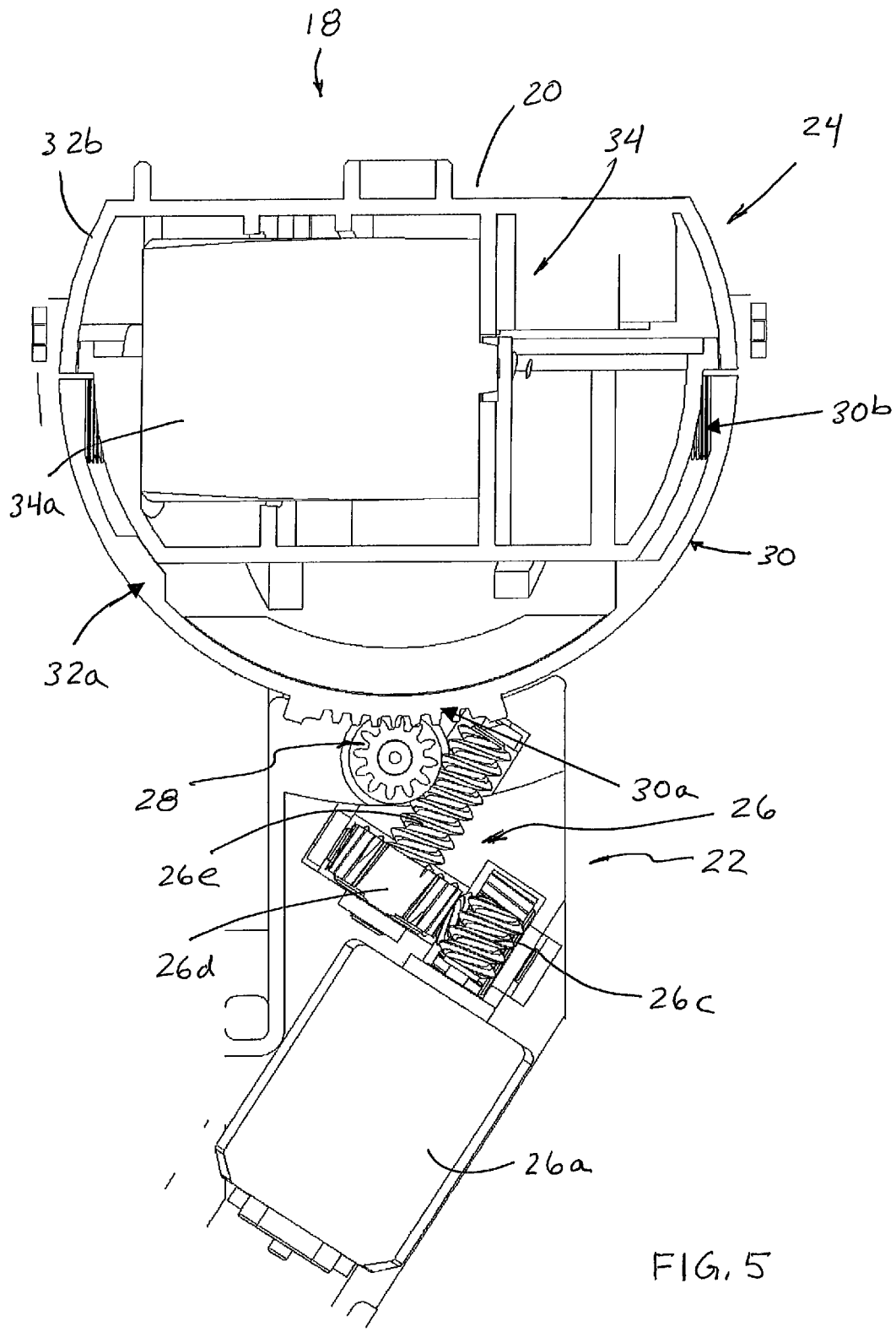
FIG. 5 is a side elevation and partial sectional view of the actuator of the present invention.

Referring now to the drawings and the illustrative embodiments depicted therein, an exterior rearview mirror assembly 10 for a vehicle includes a minor reflector or reflective element 12 received in and/or supported at or by a mirror shell or casing or head portion 14 that is movably mounted to a mounting arm or base or portion or actuator receiver or housing 16 via an actuator assembly or adjustment device 18 (FIGS. 1 and 2). Mounting arm 16 of mirror assembly 10 is mounted at the side of a host or subject vehicle, with the reflective element 12 providing a rearward field of view along the respective side of the vehicle to the driver of the vehicle. Actuator assembly 18 is received or disposed at least partially in mounting arm 16 (and/or at or at least partially in a side portion of the vehicle) and is operable to pivot the mirror head portion 14 relative to the mounting arm 16 to adjust the reflective element 12 and the rearward field of view of the driver of the vehicle, as discussed below. The actuator assembly 18 may pivot the mirror head portion 14 about generally vertical pivot axes and about generally horizontal pivot axes to adjust the mirror head portion and the reflective element upwardly/downwardly and side to side to establish the desired or appropriate rearward field of view to the driver of the vehicle, as also discussed below.

Mounting base or portion or arm 16 may be fixedly mounted at a side portion of a vehicle, or may be pivotally mounted at a side portion of a vehicle, and may provide a manually foldable mirror assembly or a powerfold mirror assembly, while remaining within the spirit and scope of the present invention. In the illustrated embodiment, mounting arm 16 comprises an elongated arm or body or member that extends upwardly and outwardly from a vehicle attachment end 16a, with the head portion 14 being adjustably disposed at an outer or mirror attachment end 16b of mounting arm 16. The mounting arm 16 comprises a generally hollow portion or cavity 16c for receiving actuator assembly 18 therein, and a mirror head attaching portion 20 of actuator assembly 18 is disposed at mirror attachment end 16b of mounting arm 16 when the actuator assembly 18 is received in the mounting arm 16. Although shown as extending generally upwardly and outwardly from a vehicle mounting area at the side of the vehicle, the mounting arm or mounting portion or actuator housing may otherwise extend from the vehicle (such as generally laterally outwardly from the side of the vehicle) or may be at least partially recessed or received in or at the side of the vehicle, while remaining within the spirit and scope of the present invention.

The mirror head portion 14 is attached to mirror head attaching portion 20 of actuator assembly 18 via any suitable means. In the illustrated embodiment, the lower region or wall or bottom 14a of mirror head portion 14 is fixedly attached to mirror head attaching portion 20 of actuator 18, such as via a fastener or fasteners or via a snap-together configuration or via an adhesive or via any other suitable mechanical or bonding means. Mirror head portion 14 may comprise any suitable shape, such as an aerodynamic shape or form, and may be selectively sized for the particular application. Optionally, the mirror head portion 14 may house or support one or more mirror or vehicle accessories, such as exterior lights or blind spot indicators or turn signal indicators or the like, while remaining within the spirit and scope of the present invention. The mirror head portion 14 may have a rearward facing surface or region 14b for attaching or mounting the reflective element 12 thereto.

Optionally, the reflective element may attach to a mounting surface of the mirror head portion or the reflective element may be received in or partially received in a receiving structure or bezel structure at the mirror head portion, while remaining within the spirit and scope of the present invention. The reflective element 12 thus may be partially received at an opening of the rearward facing region 14b or may be attached to or adhered or bonded to a mounting surface established at the rearward facing region 14b. Reflective element 12 may comprise a single pane reflective element or an electro-optic reflective element (such as an electrochromic reflective element) with front and rear substrates and an electro-optic medium sandwiched therebetween, such as discussed below. Optionally, the reflective element may have a fillet or rounded edge or radius 12a established around its perimeter edge, such as to meet safety regulations, and may not include a bezel portion that encompasses the perimeter edge of the reflective element when the reflective element is attached to the minor head portion 14. As can be seen with reference to FIG. 1, the rounded or chamfered or fillet edge 12a of reflective element 12 may provide a generally smooth curved transition from the generally planar first or outer surface 12b of the reflective element 12 to the outer walls or surfaces 14c (such as the upper, lower and side walls or surfaces) of mirror head portion 14. The reflective element 12 may be fixedly attached to mirror head portion 14, such that adjustment of the rearward field of view of the driver is accomplished via adjustment of the minor head portion by actuator assembly 18, as also discussed below.

Actuator assembly 18 is operable to pivot or adjust mirror head portion 14 relative to mounting arm 16 such that the minor head portion 14 (and thus reflective element 12 as well) is adjusted relative to mounting arm 16 about vertical and horizontal pivot axes. Actuator assembly 18 includes a fixed housing portion 21 that is at least partially received in mounting arm 16 and that houses a tilting actuator system or assembly 22 (that pivots or tilts the minor head portion 14 about a generally horizontal pivot axis to tilt the mirror head portion 14 and reflective element 12 upward and downward). A rotating actuator portion 24 (that pivots or rotates the minor head portion about a generally vertical pivot axis to pivot the minor head portion 14 and reflective element toward one side or the other) is at least partially received in a tilting element or receiver 30, which in turn is at least partially received at an upper or outer receiving portion 21a of fixed housing portion 21. The tilting actuator assembly 22 is disposed within housing portion 21, which is received within and along mounting arm 16.

In the illustrated embodiment, tilting actuator assembly 22 comprises a rotary motor and gear assembly 26 disposed within a lower portion 21b of housing portion 21, while the upper or outer receiving portion 21a of housing portion is configured to at least partially receive the partially spherical shaped tilting receiver 30. Motor and gear assembly 26 is operable (such as responsive to a user actuatable input within the vehicle) to impart rotation of a gear or toothed element 28a that engages a toothed portion 30a of partially spherical tilting receiver 30. Motor and gear assembly 26 comprises a rotary motor 26a that is operable to rotate an output shaft 26b (with a worm gear 26c disposed thereon). The worm gear 26c engages or is meshed with a gear element 26d that is connected to another worm gear 26e, which, in turn is engaged with another gear element 26f and worm gear 26g. Worm gear 26g engages a gear element 28b of a clutch assembly 28, which further includes gear element 28a and a biasing element or spring 28c disposed on a shaft or axle 28d. Gear element 28a engages the toothed portion 30a of receiver 30, whereby rotation of output shaft 26b of motor 26a imparts a rotation of gear element 28a to drive receiver 30 in one direction or another to tilt the receiver 30 and the rotating actuator portion 24 about a generally horizontal axis. Clutch assembly 28 allows for slippage between the gear element 28a and its shaft 28d to allow for manual adjustment of the mirror head portion 14 relative to the mounting portion or arm 16. Clearly, the motor and gear assembly may comprise more or less gear elements depending on the particular application of the actuator and the desired torque and speed applied during mirror adjustment.

In the illustrated embodiment, rotating actuator portion 24 comprises a housing 32, with a lower housing portion 32a being received in tilting receiver 30, and with an upper housing portion 32b comprising upper mirror head attaching portion 20. A motor and gear assembly 34 is disposed within the housing 32 and is operable to rotate a gear or toothed element 36a, which protrudes through an opening 32c in housing 32 (such as in the lower and/or upper housing portions) and engages a plurality of teeth 30b of tilting receiver 30, whereby rotation of gear element 36a imparts a rotation of housing 32 and rotating actuator portion 24 relative to tilting receiver 30 and fixed housing 21 and mounting arm 14.

Motor and gear assembly 34 comprises a rotary motor 34a that is operable to rotate an output shaft 34b (with a worm gear 34c disposed thereon). The worm gear 34c engages or is meshed with a gear element 34d that is connected to another worm gear 34e, which, in turn is engaged with another gear element 34f and worm gear 34g. Worm gear 34g engages a gear element 36b of a clutch assembly 36, which further includes gear element 36a and a biasing element or spring 36c disposed on a shaft or axle 36d. Gear element 36a engages the toothed portion 30b of receiver 30, whereby rotation of output shaft 34b imparts a rotation of gear element 36a to drive or rotate rotating actuator portion 24 in one direction or another about a generally horizontal axis and relative to receiver 30. Clutch assembly 36 allows for slippage between the gear element 36a and its shaft 36d to allow for manual adjustment of the mirror head portion 14 relative to the mounting portion or arm 16. Clearly, the motor and gear assembly may comprise more or less gear elements depending on the particular application of the actuator and the desired torque and speed applied during mirror adjustment.

Thus, the fixed housing 21 holds or supports or houses the tilting motor and gear train 26, and is fixedly mounted to or in the mirror base portion 14. The tilting receiver 30 comprises an intermediate portion of the actuator assembly and is disposed between the lower fixed housing 21 and the upper rotating actuator portion 24 and is pivotally or tiltably driven by the tilting gear train 26 via a gear profile or teeth 30a established (such as by molding or injection molding of the receiver) at the lower or bottom surface of the receiver 30. The receiver 30 supports and receives rotating actuator portion 24 so that the receiver and the rotating actuator portion tilt relative to fixed housing 21 when tilting actuator motor 26a is actuated. Rotating actuator portion 24 is rotatably received in receiver 30 and holds or supports or houses the rotating motor and gear train 34. The rotating actuator portion 24 is attached to the mirror head and is driven by the rotating gear train 34 via a gear profile or teeth 30b established (such as by molding or injection molding of the receiver) at an inner surface of the receiver 30 to rotate the rotating actuator portion 24 relative to receiver 30 and fixed housing 21 and mounting portion 14. Optionally, the mirror head portion 14 and reflective element 12 may be manually adjusted by a person or user via the slippage of the gear elements 28a and 36a of clutches 28 and 36, respectively.

Optionally, and with reference to FIGS. 6-9, an exterior rearview mirror assembly 110 for a vehicle includes a mirror reflector or reflective element 112 received in and/or supported at or by a mirror shell or casing or head portion 114 that is movably mounted to a mounting arm 116, which includes an actuator receiver or housing 116a, via an actuator assembly or adjustment device or actuator module 118. Actuator assembly 118 is received or disposed at least partially in actuator receiver 116a of mounting arm 116 and is operable to pivot the mirror head portion 114 relative to the mounting arm 116 to adjust the reflective element 112 and the rearward field of view of the driver of the vehicle, such as in a similar manner as discussed above. Similar to actuator assembly 18, actuator assembly 118 may pivot the mirror head portion about generally vertical pivot axes and about generally horizontal pivot axes to adjust the mirror head portion and the reflective element upwardly/downwardly and side to side to establish the desired or appropriate rearward field of view to the driver of the vehicle.

Figure 6:
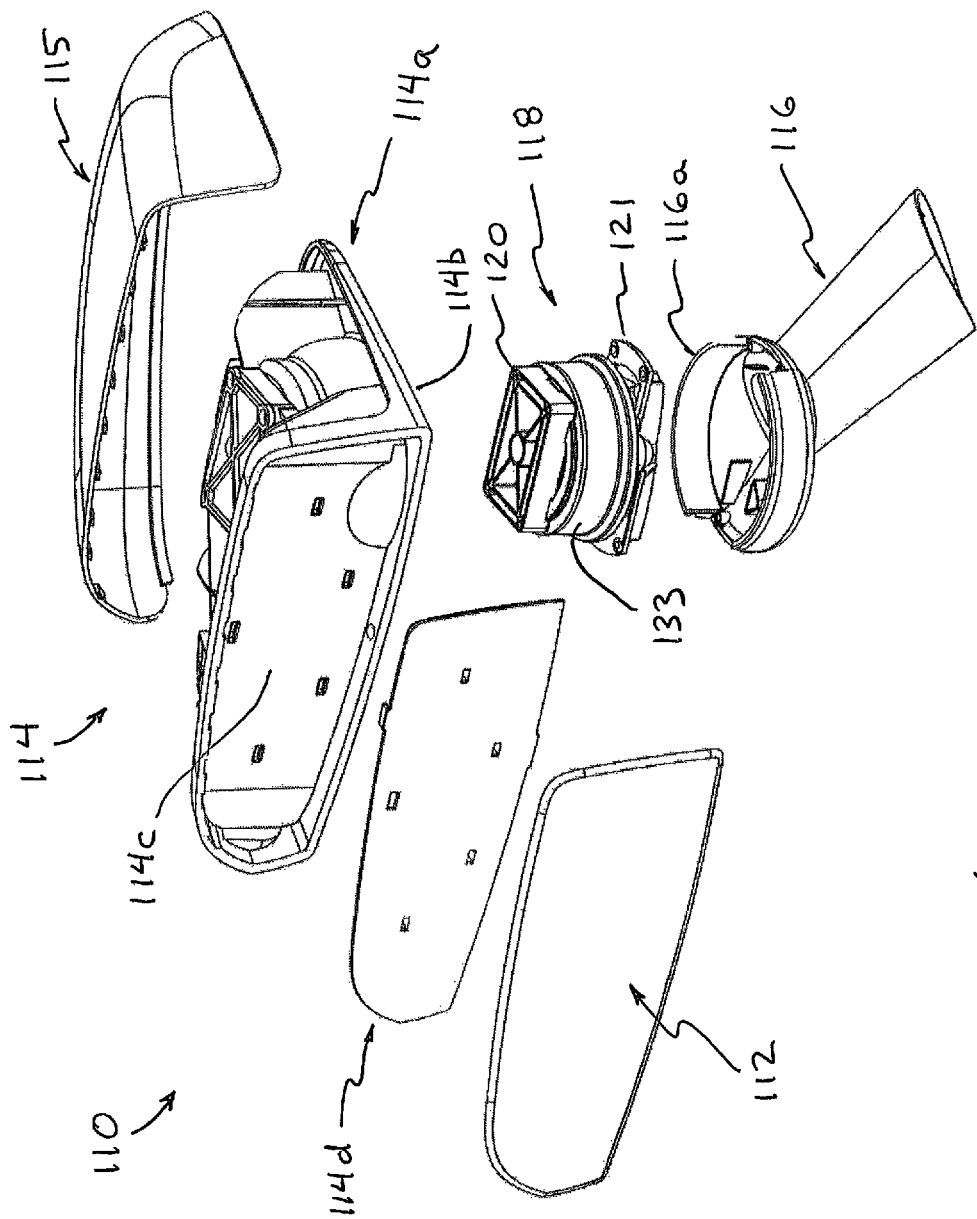
FIG. 6 is an exploded perspective view of another exterior rearview mirror assembly in accordance with the present invention.

In the illustrated embodiment, the mirror head 114 includes a base portion 114a and a cover portion 115, and the base portion 114a is attached to mirror head attaching portion 120 of actuator assembly 118 via any suitable means. As also shown in FIG. 6, the lower region or wall or bottom 114b of mirror head base portion 114a is fixedly attached to mirror head attaching portion 120 of actuator 118, such as via a fastener or fasteners or via a snap-together configuration or via an adhesive or via any other suitable mechanical or bonding means (and optionally with the mirror head attaching portion being formed to be received in a correspondingly formed recess at the base or bottom of the mirror head to provide substantially fixed engagement between the mirror head attachment portion and the mirror head). Mirror head base portion 114a and cover portion 115 may comprise any suitable shape, such as an aerodynamic shape or form, and may be selectively sized for the particular application. Optionally, the mirror head 114 may house or support one or more mirror or vehicle accessories, such as exterior lights or blind spot indicators or turn signal indicators or the like, while remaining within the spirit and scope of the present invention. The mirror head base portion 114a may have a rearward facing surface or region 114c for attaching or mounting the reflective element 112 thereto. For example, and as shown in FIG. 6, base portion 114a provides an attachment surface or portion 114c at which the mirror reflective element 112 may be attached (such as via an attachment plate 114d or the like that may be adhered to the rear or back surface of the reflective element and snapped or otherwise attached to the attaching surface or region 114c). The reflective element 112 thus may be fixedly attached to mirror head base portion 114a, such that adjustment of the rearward field of view of the driver is accomplished via adjustment of the mirror head 114 by actuator assembly 118.

Figure 7:
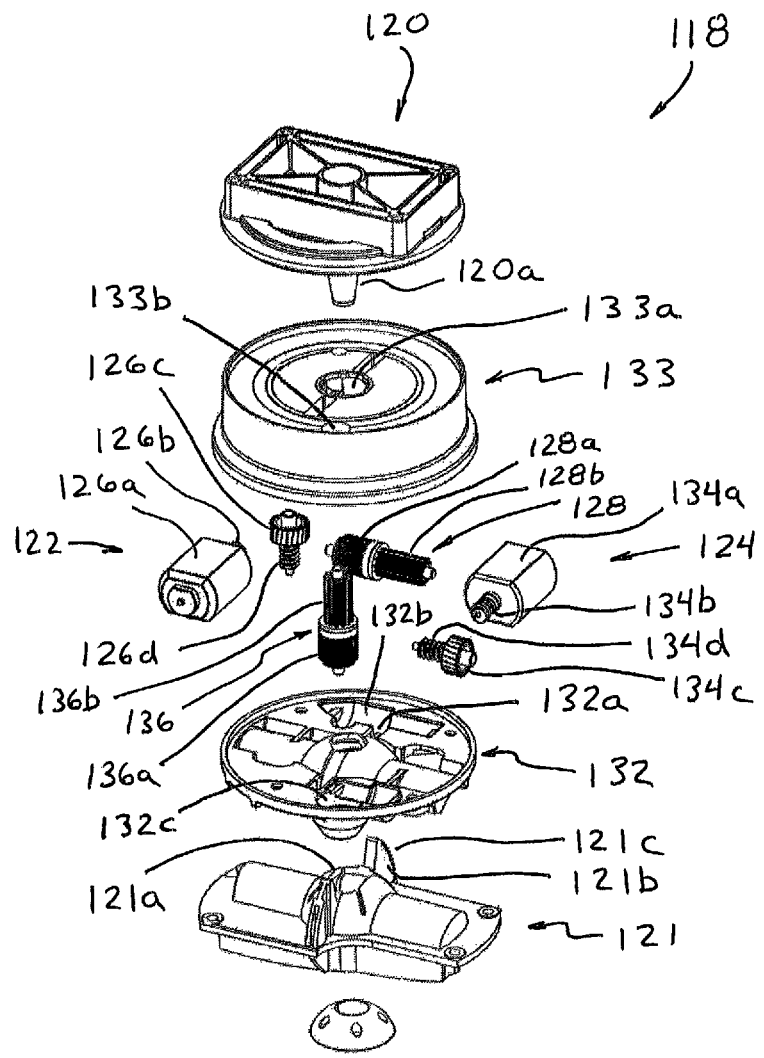
FIG. 7 is an exploded perspective view of the actuator of the exterior rearview mirror assembly of FIG. 6.
Figure 8:
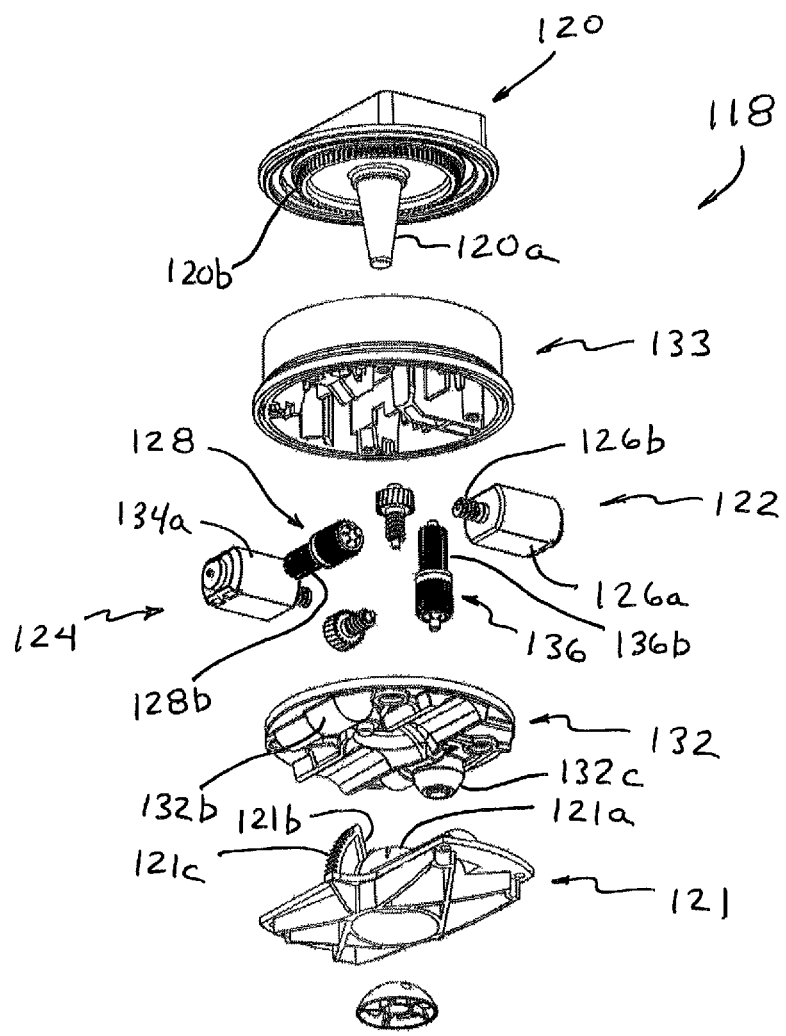
FIG. 8 is another exploded perspective view of the actuator of the exterior rearview mirror assembly of FIG. 6.

Actuator assembly 118 is operable to pivot or adjust mirror head 114 relative to mounting arm 116 such that the mirror head 114 (and thus reflective element 112 as well) is adjusted relative to mounting arm 116 about vertical and horizontal pivot axes, such as in a similar manner as described above. As shown in FIGS. 7 and 8, actuator assembly 118 includes a mirror arm attaching portion or base portion 121 that is attached to or at least partially received in and fixedly attached at actuator receiver 116a of mounting arm 116 and that includes a partially spherical pivot base 121a and curved or arcuate tilting projection 121b having a toothed portion 121c. A lower actuator support or housing element 132 is pivotally disposed at base portion 121 and mates with or engages the pivot base 121a, with the curved projection 121b being received in and projecting at least partially through a slot or aperture 132a formed in and through lower actuator support 132. Lower actuator support 132 thus is pivotally disposed at pivot base 121a and is pivotable relative thereto about a generally horizontal axis.

Lower actuator support 132 supports and/or partially houses a tilting actuator system or assembly or portion 122 (that pivots or tilts the mirror head 114 relative to pivot base 121a about the generally horizontal pivot axis to tilt the mirror head 114 and reflective element 112 upward and downward) and a rotating actuator system or assembly or portion 124 (that pivots or rotates the mirror head portion about a generally vertical pivot axis to pivot the mirror head 114 and reflective element toward one side or the other). An upper actuator support or housing element 133 is attached to lower actuator support 132 and the actuator systems 122, 124 are housed or substantially encased within the actuator supports 132, 133. The mirror head attaching portion or upper pivot plate or element 120 is pivotally mounted at or attached to upper actuator support 133 (such as via a cylindrical projection 120a of mirror head attaching element 120 received through a hole or aperture 133a at a center region of upper actuator support 133) and is pivotable about a generally vertical axis relative to upper actuator support 133 and lower actuator support 132 and base portion 121. Thus, the actuator systems 122, 124 are substantially housed or encased within the lower and upper actuator supports 132, 133, and a gear or toothed element 128b of tilting actuator system 122 engages the toothed arcuate element 121b of base portion 121 (which is received through a slot in the lower actuator support 132) and is rotatably driven to pivot the actuator supports or housing portions 132, 133, the mirror head attaching element 120 and the minor head 114 about the generally horizontal pivot axis, while a gear or toothed element 136b of rotating actuator system 124 engages a toothed ring element 120b of mirror head attaching element 120 (such as via protruding through an aperture in the upper actuator support 132 to engage the toothed ring element 120b) and is rotatably driven to pivot the mirror head attaching element 120 and the mirror head 114 about the generally vertical pivot axis, as discussed below.

In the illustrated embodiment, tilting actuator assembly 122 comprises a rotary motor and gear assembly disposed at and partially received in the lower support 132. The motor and gear assembly of tilting actuator assembly 122 is operable (such as responsive to a user actuatable input within the vehicle) to impart rotation of the gear or toothed element 128b that engages the toothed portion 121c of arcuate portion or tilting element 121b of base portion 121. The motor and gear assembly comprises a rotary motor 126a that is operable to rotate an output shaft (with a worm gear 126b disposed thereon). The worm gear 126b engages or is meshed with a gear element 126c that is connected to another worm gear 126d, which, in turn is engaged with another gear element 128a of a clutch assembly 128. Clutch assembly 128 further includes another gear element 128b and a biasing element or spring 128c disposed on a shaft or axle 128d. Gear element 128b engages the toothed portion 121c of arcuate element 121b, whereby rotation of the output shaft and worm gear 126b of motor 126a imparts a rotation of gear element 128a to drive arcuate element 121b in one direction or another to tilt the lower actuator support 132 and the tilting and rotating actuator assemblies or systems 122, 124 and upper actuator support 133 and mirror head attaching portion 120 and the mirror head 114 about a generally horizontal axis relative to the support plate or base portion 121 and mirror mounting arm 116. Clutch assembly 128 allows for slippage between the gear element 128a and its shaft 128d to allow for manual adjustment of the mirror head portion relative to the mounting portion or arm 116. Clearly, the motor and gear assembly may comprise more or less gear elements depending on the particular application of the actuator and the desired torque and speed applied during mirror adjustment.

In the illustrated embodiment, rotating actuator system 124 comprises a motor and gear assembly operable to rotate a gear element 136b of a clutch assembly 136, which may protrude through an opening 133b in upper actuator support 133 to engage the gear or toothed element or ring 120b disposed or established or formed around a portion of mirror head attaching portion 120, whereby rotation of gear element 136b imparts a rotation of mirror head attaching portion 120 relative to the lower and upper actuator supports 132, 133 and base portion 121 and mounting arm 116. In the illustrated embodiment, the motor and gear assembly of rotating actuator system 124 comprises a rotary motor 134a that is operable to rotate an output shaft (with a worm gear 134b disposed thereon). The worm gear 134b engages or is meshed with a gear element 134e that is connected to another worm gear 134d, which, in turn is engaged with a gear element 136a of clutch assembly 136, which further includes gear element 136b and a biasing element or spring 136c disposed on a shaft or axle 136d. Gear element 136b engages the gear or toothed element or ring 120b disposed around mirror head mounting portion 120, whereby rotation of the output shaft and worm gear 134b imparts a rotation of gear element 136b to drive or rotate mirror head mounting portion 120 in one direction or another about a generally vertical axis and relative to the mirror mounting arm 116. The clutch assembly 136 allows for slippage between the gear element 136a and its shaft 136d to allow for manual adjustment of the mirror head 114 relative to the mounting portion or arm 116. Clearly, the motor and gear assembly may comprise more or less gear elements depending on the particular application of the actuator and the desired torque and speed applied during mirror adjustment.

Thus, the fixed base portion or mirror arm attaching portion 121 is fixedly mounted to or in the mirror base portion or mounting arm 116, while the pivotable lower actuator support 132 and upper actuator support 133 house and support the tilting actuator assembly 122 and rotating actuator assembly 124. The arcuate tilting element 121b of base portion or element 121 is engaged by the tilting gear mechanism of tilting actuator assembly 122, of which gear element 128b engages the gear profile or teeth 121c established (such as by molding or injection molding of the support element) at and along the arcuate projection or protrusion 121b extending from the mirror arm mounting element or base portion 121 and partially through the lower actuator support 132. Thus, rotation of the gears of the tilting actuator assembly 122 causes pivoting of lower actuator support 132 and upper actuator support 133 and mirror head mounting portion 120 and the mirror head 114 about a generally horizontal axis relative to the mounting arm 116. Similarly, the rotating element or portion or toothed ring 120b of mirror head mounting portion 120 is engaged by the gear mechanism of rotating actuator assembly 124, of which gear element 136b engages the gear profile or teeth 120b established (such as by molding or injection molding of the mirror head mounting portion) at and around a lower portion of mirror head mounting portion 120. Thus, rotation of the gears of the rotating actuator assembly 124 causes pivoting of mirror head mounting portion 120 and the mirror head 114 about a generally vertical axis relative to lower actuator support 132 and upper actuator support 133 and base portion 120 and the mirror mounting arm 116. Optionally, the mirror head 114 and reflective element 112 may be manually adjusted by a person or user via the slippage of the gear elements 128b and 136b of clutches 128 and 136, respectively.

In the illustrated embodiment, the lower actuator support 132 is molded or formed to receive the clutches 128, 136 therein at the appropriate orientation and location for the gears 128b, 136b to engage the toothed elements 121c, 120b, respectively. For example, and as shown in FIG. 7, lower actuator support 132 includes a recess 132b that is disposed adjacent to or at slot 132a, whereby clutch 128 is generally horizontally received in recess 132b with gear 128b disposed at slot 132a for engaging the teeth 121c of arcuate element 121 when the actuator assembly or module 118 is assembled. Likewise, lower actuator support 132 includes a recess 132c that is disposed below or is generally aligned with aperture 133b of upper actuator support 133, whereby clutch 136 is generally vertically received in recess 132c with gear 136b projecting upward and through aperture 133b for engaging toothed ring 120b of mirror head attaching element 120 when the actuator assembly or module 118 is assembled. Thus, the actuator assembly or module 118 may be assembled to be a module that has its base portion 121 fixedly attached at the mirror mounting arm 116 and its mirror head attaching portion 120 fixedly attached at the mirror head, and with the actuator assembly 118 providing pivoting and/or rotating of the mirror head about both horizontal and vertical axes relative to the mirror mounting arm or base.

Accordingly, the present invention provides a mirror actuator that is disposed at a fixed portion of the mirror or of the vehicle, such as at the mounting portion or base portion of the mirror. The actuator thus is fixedly mounted to the mirror base (which is fixedly attached to the vehicle, such as at the door or fender area) and the mirror head is attached to the actuator. The actuator works via two separate gear trains disposed at the mirror base (each responsive to one or more user actuatable inputs that are actuatable by the driver or occupant of the vehicle when the mirror assembly is normally mounted to the vehicle). By locating the actuator at the mirror base portion, the present invention reduces outboard mass, which makes the mirror head portion lighter and improves mirror performance. Such inboard and fixed positioning of the actuator may also limit or eliminate the need for structural components in the mirror head portion, thereby providing an overall lighter mirror assembly. Also, by moving the actuator out of the head portion, the size and shape of the reflective element may be selected to provide the desired aerodynamics and aesthetic appearance. Additionally, the styling of the mirror head portion may be enhanced or optimized for other features or accessories, such as puddle lamps, turn signal indicators, blind spot indicators and/or the like.

The actuator assembly or device and its motors and gears may comprise any suitable rotational driving device or means, such as rotational driving devices similar to those used in power fold mirror applications (such as the types described in U.S. Pat. Nos. 7,314,285; 7,267,449; 7,159,992; 7,093,946; 6,312,135; 6,243,218; and 5,703,731, which are hereby incorporated herein by reference in their entireties, and may utilize aspects of the indexing and control pivoting of the mirrors described in U.S. Pat. No. 5,703,731) or the like, or may such as pivotal or rotational driving devices or actuators similar to those used in reflective element actuators (such as the types described in U.S. Pat. Nos. 7,722,199; 7,080,914; 7,073,914; 7,104,663; 6,916,100; 6,755,544; 6,698,905; 6,685,864; 6,467,920; 6,362,548; 6,243,218; 6,229,226; 6,213,612; 5,986,364 and 5,900,999, and/or U.S. patent application Ser. No. 11/504,353, filed Aug. 15, 2006 and published Jan. 4, 2007 as U.S. Publication No. 2007/002477, which are hereby incorporated herein by reference in their entireties).

Optionally, mirror reflector or reflective element may comprise a generally planar glass mirror substrate or substrates and may comprise a variably reflective, electro-optic reflective element (having a front and rear substrate with an electro-optic medium sandwiched therebetween) or a single substrate reflective element, while remaining within the spirit and scope of the present invention. The reflective element has a reflector coating for reflecting light incident thereon to provide a rearward field of view to the driver of the vehicle. The reflector coating is disposed at an appropriate surface of the reflective element.

For example, the reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. patent application Ser. No. 11/226,628, filed Sep. 14, 2005, and/or PCT Application No. PCT/US2010/029173, filed Mar. 30, 2010 and published Oct. 7, 2010 as International Publication No. WO 2010/114825, and/or PCT Application No. PCT/US10/32017, filed Apr. 22, 2010 and published Oct. 28, 2010 as International Publication No. WO 2010/124064, and/or PCT Application No. PCT/US10/51741, filed Oct. 7, 2010, which are all hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS, Optical Engineering Press, Washington (1990), which are hereby incorporated by reference herein in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 7,274,501; 5,910,854 and 6,420,036, which are all hereby incorporated herein by reference in their entireties.

Optionally, conductive electrode coated glass substrates are commercially available from various sources. For example, tin oxide-coated glass substrates, known as "TEC-Glass" products, may be obtained from Libbey-Owens-Ford Co., LOF Glass Division, Toledo, Ohio, and such as described in U.S. Pat. No. 7,004,592, which is hereby incorporated herein by reference in its entirety. Such "TEC-Glass" products are manufactured by an on-line chemical vapor deposition process that pyrolytically deposits onto clear float glass a multi-layer thin film structure, which includes a microscopically thin coating of fluorine-doped tin oxide (having a fine grain uniform structure) with additional undercoating thin film layers disposed between the fluorine-doped tin oxide layer and the underlying glass substrate. The "TEC-Glass" substrates may be available in different thicknesses, such as 2 thick or 3 mm thick glass substrates and/or the like.

Optionally, use of an elemental semiconductor mirror, such as a silicon metal mirror, such as disclosed in U.S. Pat. Nos. 7,338,177; 6,286,965; 6,196,688; 5,535,056; 5,751,489; and 6,065,840, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in U.S. Pat. Nos. 7,626,749; 7,255,451; 7,274,501 and 7,184,190; and/or U.S. patent application Ser. No. 11/226,628, filed Sep. 14, 2005, which are all hereby incorporated herein by reference in their entireties. Optionally, the reflective element may include indicia formed at and viewable at the reflective element, such as by utilizing aspects of the reflective elements described in U.S. Pat. No. 7,626,749, which are all hereby incorporated herein by reference in their entireties.

Optionally, the reflective element may comprise a single substrate with a reflective coating at its rear surface. The mirror assembly thus may comprise a prismatic mirror assembly or planar or non-planar mirror or other mirror having a single substrate reflective element, such as a mirror assembly utilizing aspects of the mirror assemblies described in U.S. Pat. Nos. 7,289,037; 7,249,860; 6,318,870; 6,598,980; 5,327,288; 4,948,242; 4,826,289; 4,436,371; and 4,435,042, which are hereby incorporated herein by reference in their entireties. Optionally, the reflective element may comprise a conventional prismatic or flat reflective element or prism, or may comprise a prismatic or flat reflective element of the types described in U.S. Pat. Nos. 7,184,190; 7,249,860; 7,255,451; 7,274,501; 7,289,037; 7,338,177; 7,420,756; and/or 7,626,749, which are all hereby incorporated herein by reference in their entireties.

Optionally, the reflective element may comprise a bent, wide-angle mirror reflector rather than a flat mirror reflector. If a bent, wide-angle mirror reflector is used, it is preferable that the mirror reflector comprise a glass substrate coated with a bendable reflector coating (such as of silicon as described in U.S. Pat. Nos. 6,065,840; 5,959,792; 5,535,056 and 5,751,489, which are hereby incorporated by reference herein in their entireties.

Optionally, an anti-reflective (AR) coating may be disposed on the front surface of the reflective element (the surface facing generally rearward with respect to the direction of travel of the vehicle when the mirror assembly is mounted to the vehicle) to reduce glare at the viewed surface of the mirror reflective element (such as by utilizing aspects described in U.S. Pat. Nos. 7,855,755 and/or 5,076,674, which are hereby incorporated herein by reference in their entireties). Optionally, a hydrophilic and/or hydrophobic coating may be disposed on the front surface of the reflective element to limit water or moisture accumulation at the reflective element and wide angle portion thereof. Optionally, the reflective element may include an anti-static means, such as a conductive coating, particularly a substantially transparent conductive coating, such as ITO, tin oxide and/or the like; index matching means to reduce internal and interfacial reflections, such as thin films of an appropriately selected optical path length; and/or light absorbing glass, such as glass tinted to a neutral density, such as "GRAYLITE" gray tinted glass (commercially available from Pittsburgh Plate Glass Industries) and "SUNGLAS" gray tinted glass (commercially available from Ford Glass Co., Detroit, Mich.), which assists in augmenting contrast enhancement. Optionally, polymer interlayers, which may be tinted gray (such as those used in electrochromic devices as taught by and described in U.S. Pat. No. 4,712,879, which is hereby incorporated herein by reference in its entirety), may be incorporated into the electro-optic or electrochromic mirrors described herein.

The reflective element may be attached to a back plate, which is attached to the rear of the reflective element (such as via any suitable adhesive or the like), and is formed or configured to attach to the mirror head portion or to the actuator assembly. Optionally, the reflective element may be fixedly attached to the mirror head portion, such as via an adhesive or bonding material disposed between the rear surface of the reflective element and an attaching surface of the mirror head portion.

Optionally, the mirror head portion or mirror casing or a back plate may include a perimeter framing portion or bezel portion that extends around the perimeter edges of the reflective element to support the reflective element and frame the reflective element at the mirror assembly (such as by utilizing aspects of the mirror assemblies described in U.S. Pat. No. 7,581,859, which is hereby incorporated herein by reference in its entirety). The perimeter bezel portion may be narrow or small depending on the particular application of the reflective element and mirror reflector sub-assembly. Optionally, the mirror reflective element may comprise a bezeless or frameless reflective element (such as the types described in U.S. Pat. Nos. 7,626,749; 7,184,190 and/or 7,255,451; and/or U.S. patent applications, Ser. No. 11/226,628, filed Sep. 14, 2005, which are hereby incorporated herein by reference in their entireties), whereby the back plate may not include a perimeter framing portion or bezel portion around the perimeter of the reflective element.

Optionally, and desirably, the mirror assembly may include a heater element that is disposed at or established at the rear surface of the reflective element to reduce fogging of the reflective element. The heater pad or element at the rear surface of the glass substrate may provide an anti-fogging of de-fogging feature to the exterior mirror assembly, and may utilize aspects of the heater elements or pads described in U.S. Pat. No. 7,400,435 and/or PCT Application No. PCT/US07/82099, filed Oct. 22, 2007 and published on May 2, 2008 as International Publication No. WO 2008/051910, which are hereby incorporated herein by reference in their entireties). The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

Optionally, the mirror reflective element may comprise an electro-optic reflective element (but could comprise a non-electro-optic reflective element) having a front substrate, a rear substrate and an electro-optic medium (such as a solid polymer matrix electrochromic medium or the like) sandwiched therebetween and sealed via a perimeter seal. The front substrate has a transparent conductor coating (such as an indium tin oxide (ITO) coating or layer) disposed at its rear surface, while the rear substrate has a mirror reflector or coating (such as a non-dichroic transflector, such as an ITO/Ag/ITO stack of layers or coatings or a silicon metal reflector coating or the like) and a transparent conductor layer (such as an ITO or F-doped or As-doped tin oxide layer or the like) disposed at its front surface. The mirror reflective element thus may comprise a third surface electro-optic mirror reflective element (such as an electrochromic mirror element). The front and rear substrates may comprise generally planar minor substrates or may have a slight radius of curvature to provide a wider angle field of view across the reflector portion depending on the particular application of the mirror reflective element and exterior rearview mirror assembly.

Optionally, the mirror assembly may include an indicator or illumination source (such as for backlighting an indicator or indicia at the reflective element), such as by utilizing aspects of the mirror assemblies described in U.S. Pat. Nos. 7,855,755; 7,492,281; 6,919,796; 6,198,409; 5,929,786; and 5,786,772, and/or U.S. patent application Ser. No. 12/446,507, filed Apr. 21, 2009, which are hereby incorporated herein by reference in their entireties.

Optionally, the minor assembly and/or reflective element may include a wide angle reflector or blind spot viewing aid or the like to provide a wide angle field of view of the blind spot area at the side of the vehicle to the driver of the vehicle. Optionally, for example, the mirror assembly may utilize aspects of the reflectors or assemblies described in U.S. Pat. Nos. 7,748,856; 7,255,451; 7,195,381; 6,717,712; 6,522,451; and/or 7,126,456, and/or U.S. patent application Ser. No. 12/187,725, filed Aug. 27, 2008, which are hereby incorporated herein by reference in their entireties.

Optionally, the minor assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 7,370,983; 7,274,501; 7,255,451; 7,184,190; 7,195,381; 6,690,268; 5,668,663 and/or 5,724,187, and/or in U.S. patent applications, Ser. No. 10/538,724, filed Jun. 13, 2005, which are all hereby incorporated herein by reference in their entireties, or may include or incorporate video displays or the like, such as the types described in U.S. Pat. Nos. 7,855,755; 7,370,983; and/or 6,690,268, which are hereby incorporated herein by reference in their entireties.

Optionally, the mirror reflective element may comprise a transflective display on demand reflective element that is partially transmissive and partially reflective, so that the light emanating from the display element may be transmitted through the reflective element when an illumination source is activated, but the display is substantially non-visible or viewable when the illumination source is deactivated. Optionally, the mirror reflective element may comprise a single substrate or non-electro-optic reflective element, with the auxiliary wide angle reflector portion being integrally formed or established at a rear surface of the reflective element, while remaining within the spirit and scope of the present invention. For example, the reflective element may utilize aspects of the reflective elements described in U.S. Pat. Nos. 7,338,177; 7,274,501; 7,255,451; 7,184,190; 6,690,268; 5,668,663 and/or 5,724,187, which are all hereby incorporated herein by reference in their entireties.

Optionally, the mirror assembly may include a blind spot indicator and/or a turn signal indicator, such as an indicator or indicators of the types described in U.S. patent applications, Ser. No. 12/264,669, filed Nov. 4, 2008; and/or Ser. No. 12/446,507, filed Apr. 21, 2009, and/or U.S. Pat. Nos. 7,492,281; 6,198,409; 5,929,786; and 5,786,772, which are hereby incorporated herein by reference in their entireties. The signal indicator or indication module may include or utilize aspects of various light modules or systems or devices, such as the types described in U.S. Pat. Nos. 7,626,749; 7,581,859; 6,227,689; 6,582,109; 5,371,659; 5,497,306; 5,669,699; 5,823,654; 6,176,602; and/or 6,276,821, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,720,580; 7,492,281; 7,038,577; 6,882,287; 6,198,409; 5,929,786; and 5,786,772, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,881,496; 7,720,580; 7,038,577; 6,882,287; 6,198,409; 5,929,786; and/or 5,786,772, and/or U.S. patent applications, and/or U.S. provisional application Ser. No. 60/618,686, filed Oct. 14, 2004 by Laubinger, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 7,005,974; and/or 6,757,109, and/or of the automatic headlamp controls described in U.S. Pat. Nos. 7,526,103; 5,796,094 and/or 5,715,093, and/or of the rain sensors described in U.S. Pat. Nos. 6,250,148 and 6,341,523, and/or of other imaging systems, such as the types described in U.S. Pat. Nos. 6,353,392 and 6,313,454, and/or PCT Application No. PCT/US2010/25545, filed Feb. 16, 2010 and published Sep. 2, 2010 as International Publication No. WO 2010/099416, and/or PCT Application No. PCT/US10/47256, filed Aug. 31, 2010, which may utilize various imaging sensors or imaging array sensors or cameras or the like, such as a CMOS imaging array sensor, a CCD sensor or other sensors or the like, such as the types disclosed in commonly assigned, U.S. Pat. Nos. 7,339,149; 5,550,677; 5,760,962; 6,097,023 and 5,796,094, and/or PCT Application No. PCT/US2003/036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. An exterior rearview mirror assembly for a vehicle, said exterior rearview mirror assembly comprising:

a mounting portion mounted to a side of a vehicle, wherein said mounting portion has a vehicle attachment portion that attaches at the side of the vehicle and a mirror head end portion outboard of the vehicle attachment portion when the vehicle attachment portion is attached at the side of the vehicle;

a mirror head portion adjustably mounted at said mirror head end portion of said mounting portion;

wherein said mirror head portion comprises a reflective element and a mirror casing, wherein said reflective element and said mirror casing are fixed relative to one another and move in tandem with one another and with said mirror head portion;

an actuator comprising (i) a mirror head attachment portion that is disposed at said mirror head end portion of said mounting portion and that fixedly attaches at said mirror head portion and (ii) a mirror arm attachment portion that fixedly attaches at a structure of said mounting portion; and wherein said actuator is electrically operable to move said mirror head attachment portion and said mirror head portion in tandem relative to said mirror arm attachment portion and said structure of said mounting portion, and wherein said actuator, when electrically operated, imparts pivotal movement of said mirror head portion relative to said mounting portion and about a generally horizontal pivot axis and a generally vertical pivot axis to pivotally and tandemly adjust said mirror head attachment portion and said mirror head portion and said reflective element relative to said mirror arm attachment portion and said structure of said mounting portion and the side of the vehicle to which said mounting portion is mounted.

2. The exterior rearview mirror assembly of claim 1, wherein said actuator comprises a tilting drive system for tilting said mirror head portion about said generally horizontal pivot axis and wherein said actuator comprises a rotating drive system for rotating said mirror head portion about said generally vertical pivot axis.

3. The exterior rearview mirror assembly of claim 2, wherein said tilting drive system is operable to tilt said rotating drive system and said mirror head portion about said generally horizontal pivot axis and relative to said structure of said mounting portion.

4. The exterior rearview mirror assembly of claim 2, wherein said tilting drive system and said rotating drive system are responsive to at least one user actuatable input that is actuatable by a driver of the vehicle to adjust a rearward field of view to the driver via adjustment of said reflective element about said generally horizontal and vertical pivot axes.

5. The exterior rearview mirror assembly of claim 2, wherein said tilting drive system comprises a motor and a plurality of gears and wherein one of said gears engages a plurality of teeth disposed along a curved element and wherein, when said motor is operated, said one of said gears rotates to move along said curved element to impart tilting of said mirror head attachment portion and said mirror head portion about said generally horizontal pivot axis.

6. The exterior rearview mirror assembly of claim 5, wherein said curved element is part of said mirror arm attachment portion and is fixed relative to said structure of said mounting portion and said tilting drive system is disposed at a housing portion of said actuator that tilts about said generally horizontal pivot axis when said motor of said tilting drive system is actuated.

7. The exterior rearview mirror assembly of claim 2, wherein said rotating drive system comprises a motor and a plurality of gears and wherein one of said gears engages a plurality of teeth disposed along a ring element at said mirror head attachment portion and wherein, when said motor is operated, said one of said gears rotates to move along said ring element to impart rotation of said mirror head attachment portion and said mirror head portion about said generally vertical pivot axis and relative to said mirror arm attachment portion and said structure of said mounting portion.

8. The exterior rearview mirror assembly of claim 7, wherein said ring element is part of said mirror head attachment portion and is fixed relative to said mirror head portion and said rotating drive system is disposed at a housing portion of said actuator that does not rotate about said generally vertical pivot axis when said motor of said rotating drive system is actuated.

9. The exterior rearview mirror assembly of claim 1, wherein said actuator is at least partially disposed in said mounting portion.

10. An exterior rearview mirror assembly for a vehicle, said exterior rearview mirror assembly comprising:
a mounting portion mounted to a side of a vehicle, wherein said mounting portion has a vehicle attachment portion that attaches at the side of the vehicle and a mirror head end portion outboard of the vehicle attachment portion when the vehicle attachment portion is attached at the side of the vehicle;
a mirror head portion adjustably mounted at said mirror head end portion of said mounting portion;
wherein said mirror head portion comprises a reflective element and a mirror casing, and wherein said reflective element is fixedly attached at an attachment portion of said mirror head portion and wherein said reflective element and said mirror casing are fixed relative to one another and move in tandem with one another and with said mirror head portion;
an actuator having a first portion attached at a fixed structure of said mounting portion and a second portion attached at said mirror head portion, wherein said second portion is at said mirror head end portion of said mounting portion; and
wherein said actuator is electrically operable to adjust said second portion and said mirror head portion in tandem relative to said fixed structure of said mounting portion and relative to the side of the vehicle to which said mounting portion is mounted, wherein said actuator comprises (i) a tilting drive system for tilting said second portion and said mirror head portion in tandem relative to said structure of said mounting portion and about a generally horizontal pivot axis and (ii) a rotating drive system for rotating said second portion and said mirror head portion in tandem relative to said structure of said mounting portion and about a generally vertical pivot axis.

11. The exterior rearview mirror assembly of claim 10, wherein said tilting drive system and said rotating drive system are responsive to at least one user actuatable input that is actuatable by a driver of the vehicle to adjust a rearward field of view to the driver via adjustment of said reflective element about said generally horizontal and vertical pivot axes.

12. The exterior rearview mirror assembly of claim 10, wherein said tilting drive system comprises a motor and a plurality of gears and wherein one of said gears engages a plurality of teeth disposed along a curved element of said first portion at said fixed structure and wherein, when said motor is operated, said one of said gears rotates to move along said curved element to impart tilting of said second portion and said mirror head portion in tandem about said generally horizontal pivot axis.

13. The exterior rearview mirror assembly of claim 10, wherein said rotating drive system comprises a motor and a plurality of gears and wherein one of said gears engages a plurality of teeth disposed along a ring element at said second portion and wherein, when said motor is operated, said one of said gears rotates to move along said ring element to impart rotation of said second portion and said mirror head portion in tandem about said generally vertical pivot axis.

14. The exterior rearview mirror assembly of claim 10, wherein said actuator is at least partially disposed in said mounting portion.

15. An exterior rearview mirror assembly for a vehicle, said exterior rearview mirror assembly comprising:
a mounting portion mounted to a side of a vehicle, wherein said mounting portion has a vehicle attachment portion that attaches at the side of the vehicle and a mirror head end portion outboard of the vehicle attachment portion when the vehicle attachment portion is attached at the side of the vehicle;
a mirror head portion adjustably mounted at said mirror head end portion of said mounting portion;
wherein said mirror head portion comprises a reflective element and a mirror casing, wherein said reflective element is fixedly attached at an attachment portion of said mirror head portion and wherein said reflective element and said mirror casing are fixed relative to one another and move in tandem with one another and with said mirror head portion;
an actuator comprising (i) a mirror arm attachment portion at a fixed structure of said mounting portion and (ii) a mirror head attachment portion at said mirror head end portion of said mounting portion;
wherein said actuator is electrically operable to move said mirror head attachment portion relative to said mirror arm attachment portion, and wherein said actuator, when electrically operated, adjusts said mirror head attachment portion and said mirror head portion in tandem relative to said mirror arm attachment portion and said fixed structure of said mounting portion and relative to the side of the vehicle to which said mounting portion is mounted, wherein said actuator comprises (i) a tilting drive system for tilting said mirror head attachment portion and said mirror head portion in tandem relative to said mirror arm attachment portion and said fixed structure of said mounting portion and about a generally horizontal pivot axis and (ii) a rotating drive system for rotating said mirror head attachment portion and said mirror head portion in tandem relative to said mounting portion and about a generally vertical pivot axis;

wherein said tilting drive system comprises a tilting drive motor and a plurality of gears and wherein one of said gears engages a plurality of teeth disposed along a curved element of said actuator and wherein, when said tilting drive motor of said tilting drive system is operated, said one of said gears rotates to move along said curved element to impart tilting of said mirror head attachment portion and said mirror head portion in tandem about said generally horizontal pivot axis; and wherein said rotating drive system comprises a rotating drive motor and a plurality of gears and wherein one of said gears engages a plurality of teeth disposed along a ring element of said actuator and wherein, when said rotating drive motor of said rotating drive system is operated, said one of said gears rotates to move along said ring element to impart rotation of said mirror head attachment portion and said mirror head portion in tandem about said generally vertical pivot axis.

16. The exterior rearview mirror assembly of claim 15, wherein said tilting drive system and said rotating drive system are responsive to at least one user actuatable input that is actuatable by a driver of the vehicle to adjust a rearward field of view to the driver via adjustment of said reflective element about said generally horizontal and vertical pivot axes.

17. The exterior rearview mirror assembly of claim 15, wherein said actuator is at least partially disposed in said mounting portion.

18. The exterior rearview mirror assembly of claim 15, wherein said actuator comprises an actuator module having (a) said mirror head attachment portion at an upper end portion and fixedly attached at said mirror head portion and (b) said mirror arm attachment portion at a lower end portion and fixedly attached at said fixed structure of said mounting portion, and wherein said actuator is operable to tilt and rotate said upper end portion relative to said lower end portion.

19. The exterior rearview mirror assembly of claim 18, wherein said ring element is part of said mirror head attachment portion at said upper end portion and wherein said curved element is part of said mirror arm attachment portion at said lower end portion.

20. The exterior rearview mirror assembly of claim 18, wherein said motor and said plurality of gears of said tilting drive system are disposed at said lower end portion and said motor and said plurality of gears of said rotating drive system are disposed at said upper end portion, and wherein said ring element and said curved element are disposed between said upper and lower end portions.

* * * * *

UNITED STATES PATENT AND TRADEMARK OFFICE
CERTIFICATE OF CORRECTION

PATENT NO. : 8,915,601 B2  
APPLICATION NO. : 13/023747  
DATED : December 23, 2014  
INVENTOR(S) : Keith Foote and Joseph Snow Page 1 of 1

It is certified that error appears in the above-identified patent and that said Letters Patent is hereby corrected as shown below:

Specification

Column 2  
Line 21, "minor" should be --mirror--.

Column 3  
Line 32, "minor" should be --mirror--;  
Line 42, "minor" should be --mirror--;  
Line 46, "minor" should be --mirror--;  
Line 51, "minor" should be --mirror--;  
Line 54, "minor" should be --mirror--;  
Line 55, "minor" should be --mirror--.

Column 6  
Line 10, "121 a" should be --121a--;  
Line 47, "minor" should be --mirror--.

Column 7  
Line 34, "134e" should be --134c--.

Column 10  
Line 38, "minor" should be --mirror--.

Column 12  
Line 21, "minor" should be --mirror--;  
Line 33, "minor" should be --mirror--;  
Line 43, "minor" should be --mirror--.

Signed and Sealed this  
Tenth Day of November, 2015

Michelle K. Lee  
*Director of the United States Patent and Trademark Office*